US012669602B2

(12) United States Patent (10) Patent No.: US 12,669,602 B2
Youssef (45) Date of Patent: Jun. 30, 2026

(54) METHOD AND SYSTEM FOR CLASSIFYING STATE OF A WEARABLE DEVICE

(71) Applicant: INVENSENSE, INC, San Jose, CA (US)

(72) Inventor: Joe Youssef, Noyarey (FR)

(73) Assignee: INVENSENSE, INC, San Jose, CA (US)

( * ) Notice: Subject to any disclaimer, the term of this patent is extended or adjusted under 35 U.S.C. 154(b) by 68 days.

(21) Appl. No.: 18/826,075

(22) Filed: Sep. 5, 2024

(65) Prior Publication Data

US 2025/0189665 A1 Jun. 12, 2025

Related U.S. Application Data

(60) Provisional application No. 63/608,873, filed on Dec. 12, 2023.

(51) Int. Cl.
*G01S 15/04* (2006.01)
*G01S 7/52* (2006.01)
*G01S 15/87* (2006.01)

(52) U.S. Cl.
CPC .......... *G01S 15/04* (2013.01); *G01S 7/52004* (2013.01); *G01S 15/876* (2013.01)

(58) Field of Classification Search
CPC ..... G01S 15/04; G01S 7/52004; G01S 15/876
See application file for complete search history.

(56) References Cited

U.S. PATENT DOCUMENTS

| | | | | |
|---|---|---|---|---|
| 7,817,104 B2 * | 10/2010 | Ryu | ........................ | G06F 3/013 |
| | | | | 396/296 |
| 8,510,990 B2 * | 8/2013 | Agam | ..................... | E05F 15/73 |
| | | | | 49/28 |
| 8,603,014 B2 * | 12/2013 | Alleman | .............. | A61B 8/4427 |
| | | | | 601/2 |
| 10,845,870 B2 * | 11/2020 | Yang | ........................ | G06F 3/011 |
| 11,209,541 B1 * | 12/2021 | Gris | ........................ | G01S 15/101 |
| 11,526,018 B2 * | 12/2022 | Senkal | ................ | G01S 15/8915 |
| 12,433,569 B2 * | 10/2025 | Ramamurthy | ....... | A61B 8/0808 |
| 2024/0180522 A1 * | 6/2024 | Colombo | ............... | A61B 8/085 |

* cited by examiner

*Primary Examiner* — John A Tweel, Jr.

(57) ABSTRACT

Methods and systems are disclosed for employing an ultrasonic sensor to classify the state of a wearable device. Ultrasonic pulses are emitted from a pair of ultrasonic transducers. The pair of ultrasonic transducers are in a line of sight relationship when the user is in a first state with respect to the wearable device and are not in a line of sight relationship when the user is in a second state with respect to the wearable device. The returned signals are evaluated and the state of the wearable device is classified as being one of the first state and the second state based at least in part on the evaluation.

22 Claims, 8 Drawing Sheets

COMMUNICATIONS INTERFACE 105

HOST PROCESSOR 110

HOST MEMORY 111

TRANSCEIVER 113

SENSOR PROCESSOR 130

INTERNAL MEMORY 140

CONTROLLER 151

100B

SENSOR PROCESSING UNIT (SPU) 120

ULTRASONIC TRANSDUCER PAIR 150

ALTERNATELY EMIT ULTRASONIC
PULSES FROM ULTRASONIC
TRANSDUCER PAIR — 400

EVALUATE RECEIVED SIGNALS — 402

CLASSIFY STATE OF
WEARABLE DEVICE — 404

METHOD AND SYSTEM FOR CLASSIFYING STATE OF A WEARABLE DEVICE

CROSS-REFERENCE TO RELATED APPLICATIONS

This application claims priority to U.S. Provisional Patent Application No. 63/608,873, filed Dec. 12, 2023, entitled "Donning and Doffing with Multiple Ultrasonic Sensors in Pitch-Catch Mode," the content of which is incorporated by reference in its entirety.

FIELD OF THE PRESENT DISCLOSURE

This invention relates to the use of an ultrasonic transducer to classify the state of a wearable device with respect to a user.

BACKGROUND

A variety of devices exist which utilize sonic sensors (e.g., sonic emitters and receivers, or sonic transducers). By way of example, and not of limitation, a device may utilize one or more sonic sensors to track the location of the device in space, to detect the presence of objects in the environment of the device, and/or to avoid objects in the environment of the device. Such sonic sensors include transmitters which transmit sonic signals, receivers which receive sonic signals, and transducers which both transmit sonic signals and receive sonic signals. Many of these sonic transducers emit signals in the ultrasonic range, and thus may be referred to as ultrasonic transducers. Piezoelectric Micromachined Ultrasonic Transducers (PMUTs), which may be air-coupled, are one type of sonic transducer which operates in the ultrasonic range. Sonic transducers, including ultrasonic transducers, can be used for a large variety of sensing applications such as, but not limited to: virtual reality controller tracking, presence detection, object detection/location, and object avoidance. For example, drones, robots, security systems or other devices may use ultrasonic transducers and/or other sonic transducers in any of these or numerous other applications.

Notably, a device intended to be worn by a user may benefit from the sensing technology to determine when the device is being worn. Such a determination improves the user experience by allowing more refined operation of the device. As a non-limiting illustration, resources may be conserved by selectively powering the device based on classifying whether the device is worn or not. For example, a head mounted display (HMD) such as for virtual or augmented reality headset can be powered down to save energy when not being worn. Likewise, other aspects of device operation may be controlled depending on its classification state. Accordingly, this disclosure is directed to systems and methods for employing ultrasonic transducers to determine whether a device is worn or not.

SUMMARY

The disclosure is directed to a wearable device having a pair of ultrasonic transducers, each transducer configured to emit ultrasonic pulses and receive returned signals corresponding to the emitted ultrasonic pulses. The pair of ultrasonic transducers have predetermined positions with respect to the wearable device, are in a line-of-sight relationship when the user is in a first state with respect to the wearable device, and are not in a line of sight relationship when the user is in a second state with respect to the wearable device. The pair of ultrasonic transducers are configured to alternately emit ultrasonic pulses. The device also has at least one processor coupled with the pair of ultrasonic transducers and configured to evaluate the returned signals; and based at least in part on the evaluation, classify the state of the wearable device as being one of the first state and the second state.

This disclosure also includes a sensor processing unit that may be coupled to a pair of ultrasonic transducers, each transducer configured to emit ultrasonic pulses and receive returned signals corresponding to the emitted ultrasonic pulses. The pair of ultrasonic transducers have predetermined positions with respect to a wearable device configured to be fitted to a user, the pair of ultrasonic transducers are in a line of sight relationship when the user is in a first state with respect to the wearable device, and the pair of ultrasonic transducers are not in a line of sight relationship when the user is in a second state with respect to the wearable device. The pair of ultrasonic transducers may be configured to alternately emit ultrasonic pulses. At least one sensor processor may be coupled with the pair of ultrasonic transducers and configured to evaluate the returned signals and based at least in part on the evaluation, classify the state of the wearable device as being one of the first state and the second state.

Further, this disclosure includes a method for classifying state of a wearable device, wherein the wearable device is configured to be fitted to a user. The method may involve alternately emitting ultrasonic pulses from a pair of ultrasonic transducers, such that each transducer may be configured to emit ultrasonic pulses and receive returned signals corresponding to the emitted ultrasonic pulses, the pair of ultrasonic transducers have predetermined positions with respect to the wearable device, the pair of ultrasonic transducers are in a line of sight relationship when the user is in a first state with respect to the wearable device, and the pair of ultrasonic transducers are not in a line of sight relationship when the user is in a second state with respect to the wearable device. The method may also involve evaluating retuned signals from received by the pair of ultrasonic transducers and classifying the state of the wearable device as being one of the first state and the second state based at least in part on the evaluation.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
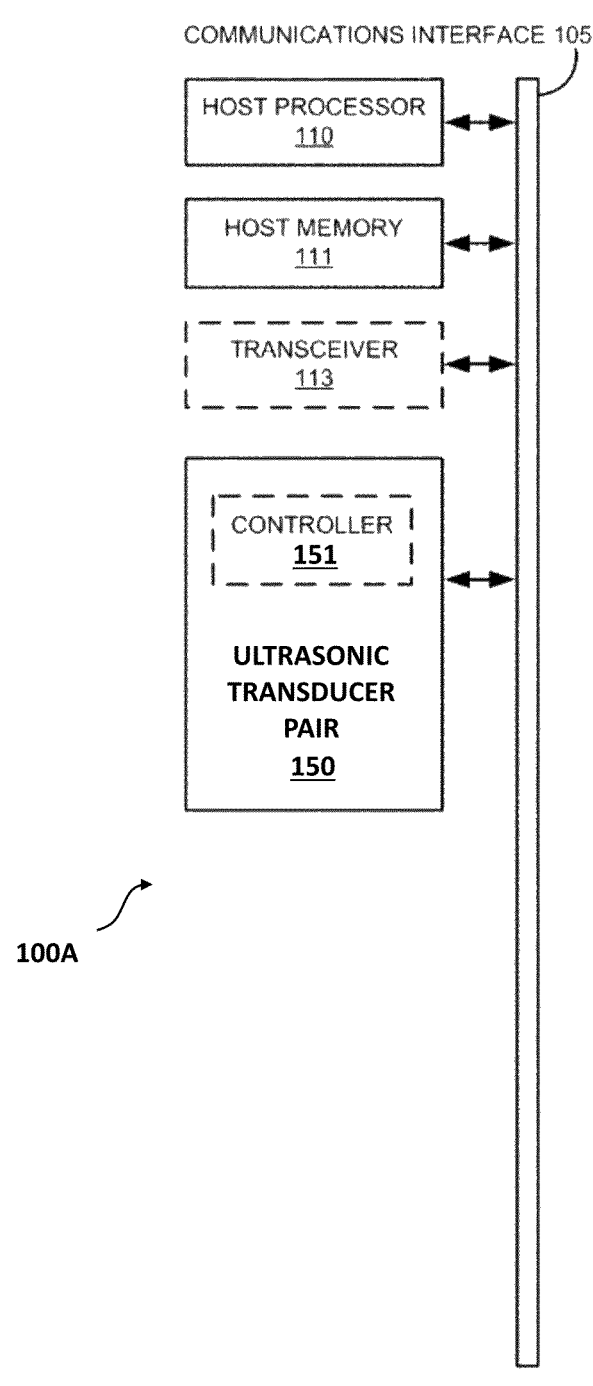
FIGS. 1A and 1B show example block diagrams of some aspects of a device which includes a sonic transducer, in accordance with various embodiments.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a Motion Processor Unit (MPU) or Sensor Processing Unit (SPU) and a microprocessor, a plurality of microprocessors, one or more microprocessors in conjunction with an MPU/SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Sonic transducers, which include ultrasonic transducers, emit a pulse (e.g., an ultrasonic sound) and then receive returned signals (i.e., echoes) after the ultrasonic waves from the emitted sound are reflected off objects or persons. In this manner, the returned signals correspond to the emitted pulse. In such a transducer, the returned signals can be used to detect the presence and/or location of objects from which the emitted pulse reflects and then returns to the transducer as a returned signal. In other instances, a first ultrasonic transducer may emit a pulse and the echoing returned signals are received by a second ultrasonic transducer.

As will be discussed below, the techniques of this disclosure employ a pair of ultrasonic transducers that alternately emit pulses. The transducers are configured to have predetermined positions with respect to the wearable device so that they are in a line of sight relationship when the user is in a first state with respect to the wearable device and they are not in a line of sight relationship when the user is in a second state with respect to the wearable device. For example, the first state may correspond to the device not being worn so that the user does not block the line of sight relationship. Similarly, the second state may correspond to the device being worn in a manner that does block the line of sight relationship. By evaluating the signals returned from the alternating emitted pulses, the state of the wearable device may be classified as being one of the first state and the second state.

Herein, a variety of methods, sonic transducers, devices, and techniques are described for identifying stationary objects as opposed to a user with an ultrasonic transducer. Although this technology is described herein with reference to ultrasonic transducers, it is broadly applicable to any sonic transducer which might be similarly utilized. In the detailed description, the technology is described with examples in which sonic pulses are emitted and received by a single transducer, however the technology may be implemented with a transducer which emits sonic pulses and one or more other transducers which receive returned signals that result from the emissions. Though the sensed environment where detection of stationary objects takes place is often referred to as a room or indoor space in this detailed description, it should be appreciated that the techniques described are applicable to other environments.

Discussion begins with a description of notation and nomenclature. Discussion then shifts to description of some block diagrams of example components of an example device and a sensor processing unit which may utilize an ultrasonic transducer (or other sonic transducer). The device may be any type of device which utilizes sonic sensing, for example any device which uses ultrasonic transducers may employ the techniques and methods described herein. Discussion then moves to description of a device using a sonic transducer to detect for objects in an environment and within a distance range of interest from the ultrasonic transducer. Returned signals from an emitted pulse are discussed along with methods for utilizing the returned signals to detect a stationary object in an environment of the sonic transducer. Finally, operation of the device, sensor processor, and/or components thereof are described in conjunction with description of a method of detecting a stationary object with an ultrasonic transducer.

Figure 1B:
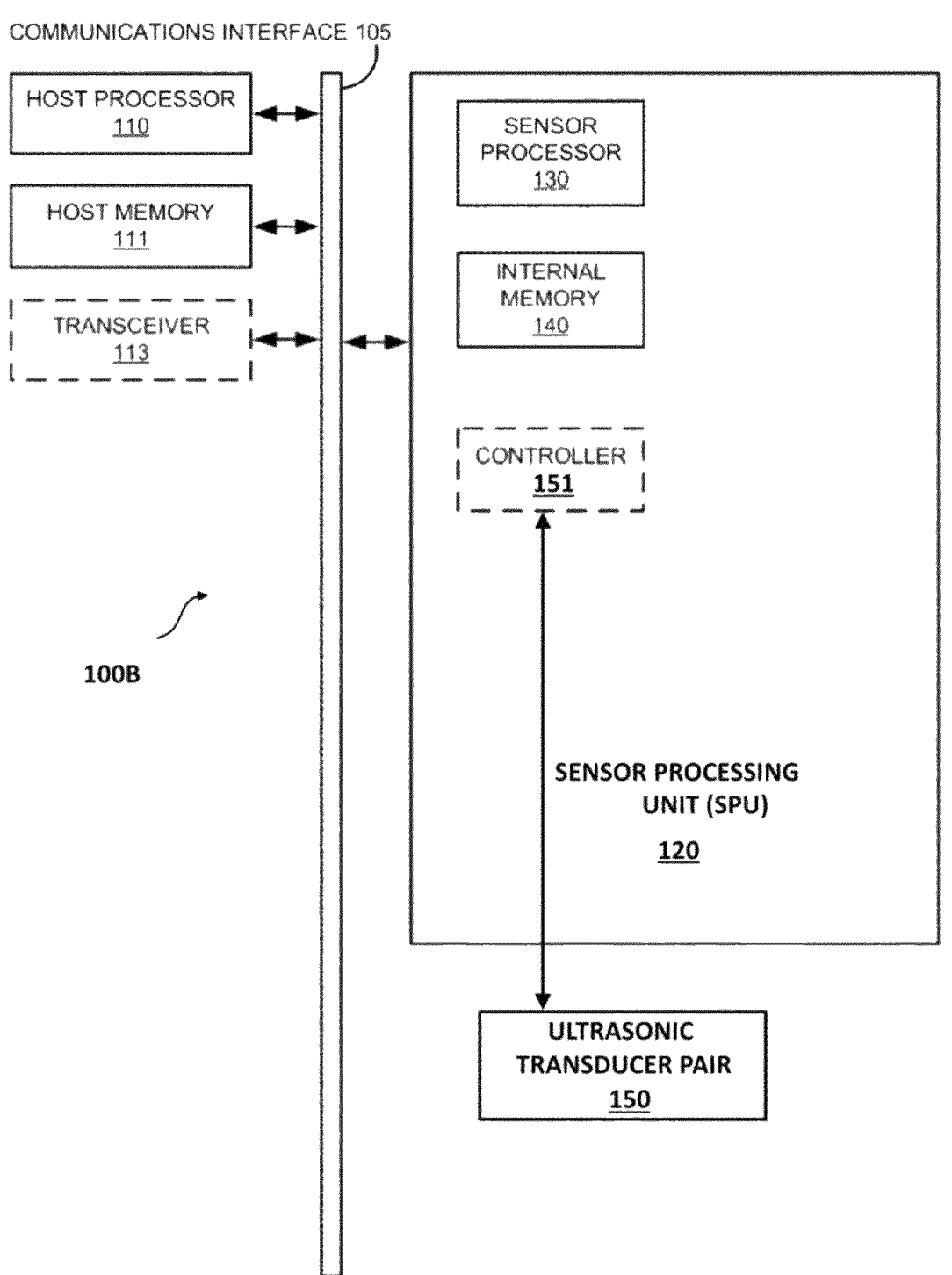

To help illustrate aspects of this disclosure, FIGS. 1A and 1B show example block diagrams of some aspects of a device 100 which includes a pair of sonic transducers such as ultrasonic transducer pair 150, in accordance with various embodiments. As noted above, device 100 may be configured to be worn on a user's head and function as a head mounted display for providing a virtual or augmented reality experience. However, it should also be recognized that device 100 may be a back pack, a belt, a watch, a ring, any type of protective apparel such as a helmet, or any other apparatus that is configured to be worn by a user. Correspondingly, ultrasonic transducer pair 150 may be used to classify the state of device 100 with respect to a user, such as by determining whether the device is being worn or not.

FIG. 1A shows a block diagram of components of an example device 100A, in accordance with various aspects of the present disclosure. As shown, example device 100A comprises a communications interface 105, a host processor 110, host memory 111, and at least one ultrasonic transducer pair 150. In some embodiments, device 100 may additionally include a transceiver 113. Though not depicted, some embodiments of device 100A may include one or more additional sensors used to detect motion, position, or environmental context. Some examples of these additional sensors may include, but are not limited to: inertial motion sensors such as gyroscopes and accelerometers, infrared sensors, cameras, microphones, atmospheric pressure sensors, temperature sensors, and global navigation satellite system sensors (i.e., a global positioning system receiver). As depicted in FIG. 1A, included components are communicatively coupled with one another, such as, via communications interface 105.

The host processor 110 may, for example, be configured to perform the various computations and operations involved with the general function of a device 100. Host processor 110 can be one or more microprocessors, central processing units (CPUs), DSPs, general purpose microprocessors, ASICs, ASIPs, FPGAs or other processors which run software programs or applications, which may be stored in host memory 111, associated with the general and conventional functions and capabilities of device 100. In some embodiments, a host processor 110 may perform some amount of the processing of received returned signals from ultrasonic transducer pair 150 and/or some aspects of the methods of classifying the state of wearable device 100 that are described herein. Notably, host processor 110 may implement an algorithm configured to determine whether device 100 is being worn.

Communications interface 105 may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent and may include a plurality of communications interfaces. Communications interface 105 may facilitate communication between a sensor processing unit (SPU) 120 (see e.g., FIG. 1B) and one or more of host processor 110, host memory 111, transceiver 113, ultrasonic transducer pair 150, and/or other included components.

Host memory 111 may comprise programs, modules, applications, or other data for use by host processor 110. In some embodiments, host memory 111 may also hold information that is received from or provided to SPU 120 (see e.g., FIG. 1B). Host memory 111 can be any suitable type of memory, including but not limited to electronic memory (e.g., read only memory (ROM), random access memory (RAM), or other electronic memory). Host memory 111 may include instructions to implement one or more of the methods described herein using host processor 110 and ultrasonic transducer pair 150.

Transceiver 113, when included, may be one or more of a wired or wireless transceiver which facilitates receipt of data at device 100 from an external transmission source and transmission of data from device 100 to an external recipient. By way of example, and not of limitation, in various embodiments, transceiver 113 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications (or the like) for wireless personal area network communication), and a wired a serial transceiver (e.g., a universal serial bus for wired communication).

Ultrasonic transducer pair 150 is configured to alternately emit ultrasonic pulses which are in the ultrasonic range and receive either or both reflected signals and pulses directly transmitted by the other transducer. In some embodiments, ultrasonic transducer pair 150 may include a controller 151 for locally controlling the operation of the ultrasonic transducer pair 150. Additionally, or alternatively, in some embodiments, one or more aspects of the operation of ultrasonic transducer pair 150 or components thereof may be controlled by an external component such as host processor 110. Device 100A may contain at least a single ultrasonic transducer pair 150, or may contain more than two ultrasonic transducers, for example in the form of an array of ultrasonic transducers, at least two of which are in a line of sight relationship depending on the state of device 100 with respect to the user. Each ultrasonic transducer may be in an emitting phase for a portion of its duty cycle and in a receiving phase during another portion of its duty cycle.

Controller 151, when included, may be any suitable controller, many types of which have been described herein. In some embodiments, controller 151 may control the duty cycle (emit or receive) of the ultrasonic transducer pair 150 and the timing of switching between emitting and receiving. In some embodiments, a controller 151 may perform some amount of the processing of received returned signals and/or some aspects of the methods of detecting stationary objects that are described herein. For example, controller 151 may classify the state of device 100 alone or in conjunction with host processor 110.

FIG. 1B shows a block diagram of components of an example device 100B, in accordance with various aspects of the present disclosure. Device 100B is similar to device 100A except that it includes a sensor processing unit (SPU) 120 coupled with at least one ultrasonic transducer pair 150. SPU 120, when included, comprises: a sensor processor 130 and an internal memory 140. Though not depicted, in some embodiments, SPU 120 may additionally include one or more motion sensors and/or one or more other sensors such a light sensor, infrared sensor, GNSS sensor, temperature sensor, barometric pressure sensor, microphone, an audio recorder, a camera, etc. In various embodiments, SPU 120 or a portion thereof, such as each sensor processor 130, is communicatively coupled with host processor 110, host memory 111, and/or other components of device 100 through communications interface 105 or other well-known means. SPU pair 120 may also comprise one or more communications interfaces (not shown) similar to communications interface 105 and used for communications among one or more components within SPU 120.

Sensor processor 130 can be one or more microprocessors, CPUs, DSPs, general purpose microprocessors, ASICs, ASIPs, FPGAs or other processors that run software programs, which may be stored in memory such as internal memory 140 (or elsewhere), associated with the functions of SPU 120. In some embodiments, one or more of the functions described as being performed by sensor processor 130 may be shared with or performed in whole or in part by another processor of a device 100, such as host processor 110. In some embodiments, either or both sensor processor 130 may perform some amount of the processing of received returned signals and/or some aspects of the methods of classifying state of device 100 with respect to the user.

Internal memory 140 can be any suitable type of memory, including but not limited to electronic memory (e.g., read only memory (ROM), random access memory (RAM), or other electronic memory). Internal memory 140 may store algorithms, routines, or other instructions for instructing sensor processor 130 on the processing of data output by each ultrasonic transducer 150 and/or other sensors. In some embodiments, internal memory 140 may store one or more modules which may be algorithms that execute on sensor processor 130 to perform a specific function. Some examples of modules may include, but are not limited to: statistical processing modules, motion processing modules, object detection modules, object location modules, and/or decision-making modules. Modules may include instructions to implement one or more of the methods described herein using host processor 110, sensor processor 130, and or controller 151.

Ultrasonic transducer pair 150 or SPU 120, as previously described, includes at least two transducers that are configured to alternately emit ultrasonic pulses which are in the ultrasonic range. As described in further detail below, a pulse emitted by one of the transducers may be reflected by one or more objects and returned to the emitting transducer. Further, a pulse emitted by one of the transducers may also be received directly by the other transducer when a line of sight relationship exists between them reflected by one or more objects and each emitted pulse returned to the emitting transducer. In some embodiments, a plurality of ultrasonic transducers 150 may be included and one may emit sonic signals while one or more others receive resulting signals from the emitted sonic signals. In some embodiments, ultrasonic transducer pair 150 may include a controller 151 for locally controlling the operation of the ultrasonic transducer pair 150 or for locally controlling the operation of SPU 120. Additionally, or alternatively, in some embodiments, one or more aspects of the operation of ultrasonic transducer pair 150, SPU 120 or components thereof may be controlled by an external component such as sensor processor 130 and/or host processor 110. Each ultrasonic transducer 151 is communicatively coupled with sensor processor 130 by a communications interface (such as communications interface 105), bus, or other well-known communication means.

Controller 151, when included, may be any suitable controller, many types of which have been described herein. In some embodiments, controller 151 may control the duty cycle (emit or receive) of the ultrasonic transducer pair 150 and the timing of switching between emitting and receiving. In some embodiments, a controller 151 may perform some amount of the processing of received returned signals and/or some aspects of the methods of detecting stationary objects that are described herein. For example, controller 151 may classify the state of device 100 alone or in conjunction with host processor 110 and/or sensor processor 130.

Figure 2:
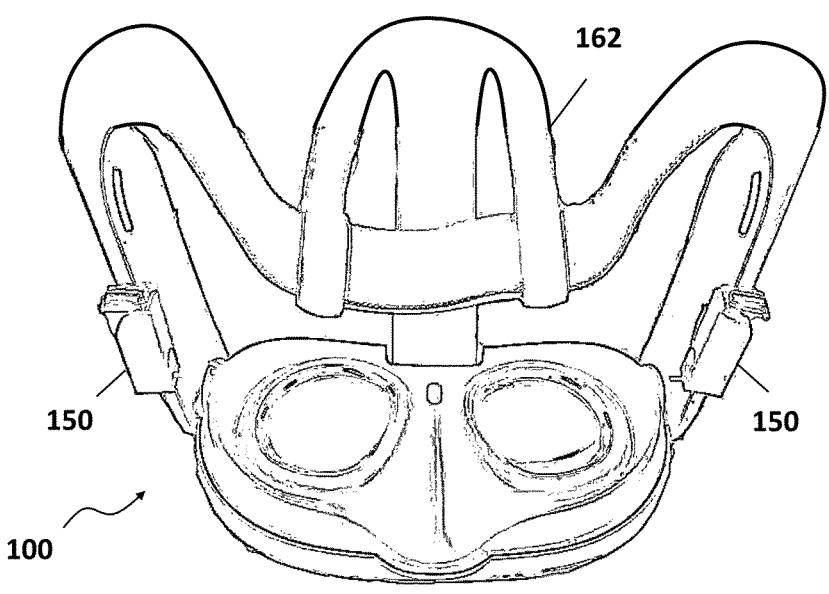
FIG. 2 shows an example of a wearable device having an ultrasonic transducer pair, in accordance with various embodiments.
Figure 3:
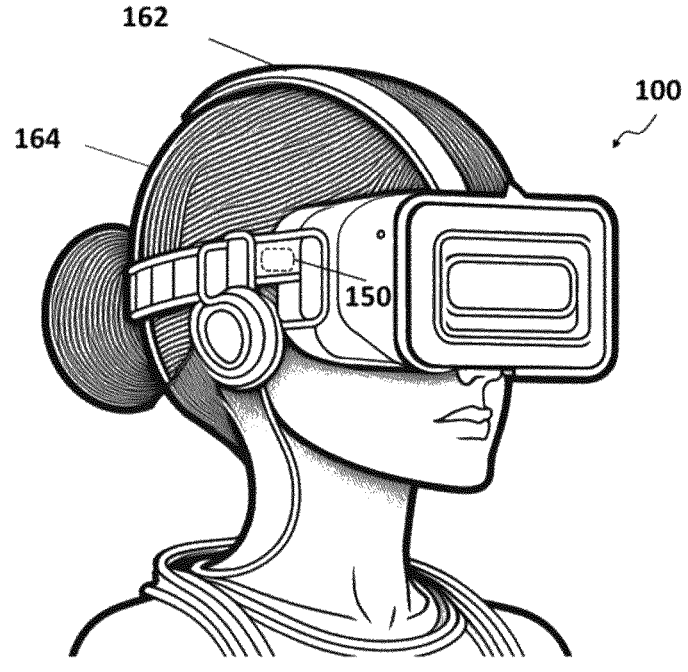
FIG. 3 shows an example of the wearable device of FIG. 2 being worn, in accordance with various embodiments.

Turning now to FIG. 2, an elevational view of device 100 configured as a head mounted display is shown. In particular, each transducer of ultrasonic transducer pair 150 is located at predetermined locations with respect to device 100 so that they are in a line of sight relationship when device 100 is not being worn. In this embodiment, device 100 includes band 162 which is configured to fit snugly around a user's head when device 100 is worn as can be seen in the schematic view of FIG. 3. As also shown in FIG. 3, head 164 of the user occupies a space between ultrasonic transducer pair 150 (one of which is indicated in phantom), blocking their line of sight relationship. Correspondingly, when device 100 is in a first state, such as shown in FIG. 2, pulses emitted by one transducer of ultrasonic transducer pair 150 may be received directly by the other transducer and when device 100 is in a second state, such as shown in FIG. 3, pulses emitted by one transducer of ultrasonic transducer pair 150 cannot be received directly by the other transducer because the line of sigh relationship is blocked by head 164. Although ultrasonic transducer pair 150 is shown in these views, it should be recognized that SPU 120 may be used in alternative implementations as desired.

Further, when device 100 is in the second state shown in FIG. 3, head 164 is at an expected distance from each transducer of ultrasonic transducer pair 150. In some embodiments, each of the transducers is symmetrically positioned so that head 164 is at the same distance from each when device 100 is worn. However, asymmetrical positioning may also be employed, but an expected distance for each is still known based on the predetermined positioning of the transducers.

Accordingly, two characteristics are typically exhibited when device 100 is in the second state. Notably, head 164 blocks the line of sight relationship between ultrasonic transducer pair 150 so that a pulse emitted by one is not directly received by the other and each transducer detects the presence of head 164 at an expected distance. Conversely, when device 100 is in the first state, a pulse emitted by one transducer of ultrasonic transducer pair 150 may typically be directly received by the other.

However, under certain conditions, the line of sight relationship between ultrasonic transducer pair 150 may be partially or completely blocked even when device 100 is not being worn. For example, band 162 is relatively flexible and a portion of it may fall between ultrasonic transducer pair 150 when not being worn. As another example, if device 100 is being stored in a bag or similar container, other loose objects may also interfere with the line of sight relationship. Regardless of the cause, if the blockage is only partial, some portion of the pulse emitted by one transducer is still received by the other and is distinguishable from the complete blockage that would be cause caused by head 164 when device 100 is worn. Moreover, even if the blockage is complete, it is unlikely that an object other than head 164 (whether band 162 or some other object) would occupy the exact same space as head 164. As such, each transducer of ultrasonic transducer pair 150 will detect the object at a distance other than that expected to correspond to head 164 when device 100 is worn. Therefore, evaluating the signals received by ultrasonic transducer pair 150 or SPU 120 may include determining whether a pulse was directly received after being emitted by the other transducer as well as determining whether an object detected based on the reflection of an emitted pulse is located at a distance that would be expected when device 100 is worn, such as by the user's head 164 or another portion of the body depending on how device 100 is intended to be worn.

Figure 4:
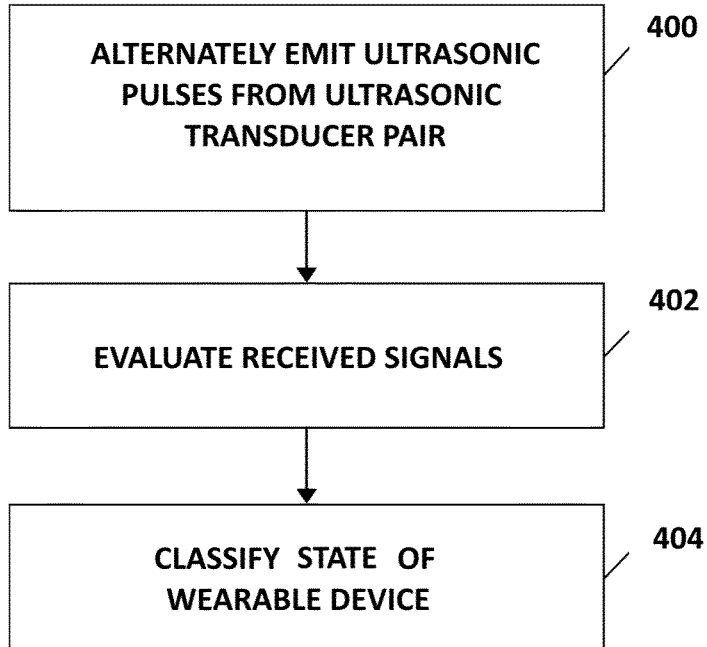
FIG. 4 illustrates an exemplary routine for classifying state of a wearable device, in accordance with various embodiments.

To help illustrate aspects of the disclosed techniques, FIG. 4 illustrates a flow diagram of a method of classifying state of a wearable device, in accordance with various embodiments. As noted above, an ultrasonic transducer pair is used to emit ultrasonic pulses and receive returned signals corresponding to the emitted ultrasonic pulse or pulses emitted by the other transducer. Correspondingly, beginning with 400, the method may involve alternately emitting ultrasonic pulses from a pair of ultrasonic transducers. As noted above, each transducer may be configured to emit ultrasonic pulses and receive returned signals corresponding to the emitted ultrasonic pulses. Each transducer may also receive ultrasonic pulses emitted by the other transducer when a line of sight relationship exists between the pair. In 402, the received signals are evaluated. Again, the received signals may be reflections of a pulse emitted by one of the transducer from nearby objects or may be direct transmissions of a pulse emitted the other transducer. Based on characteristics such as those described above, the state of the wearable device is classified as being one of a first state and a second state in 404.

The following materials show representative signals that may be received by a pair of ultrasonic transducers under conditions in which the pair of ultrasonic transducers are in a line of sight relationship, indicating the user is in a first state with respect to the wearable device, and conditions in which the pair of ultrasonic transducers are not in a line of sight relationship, indicating the user is in a second state with respect to the wearable device.

Figure 5:
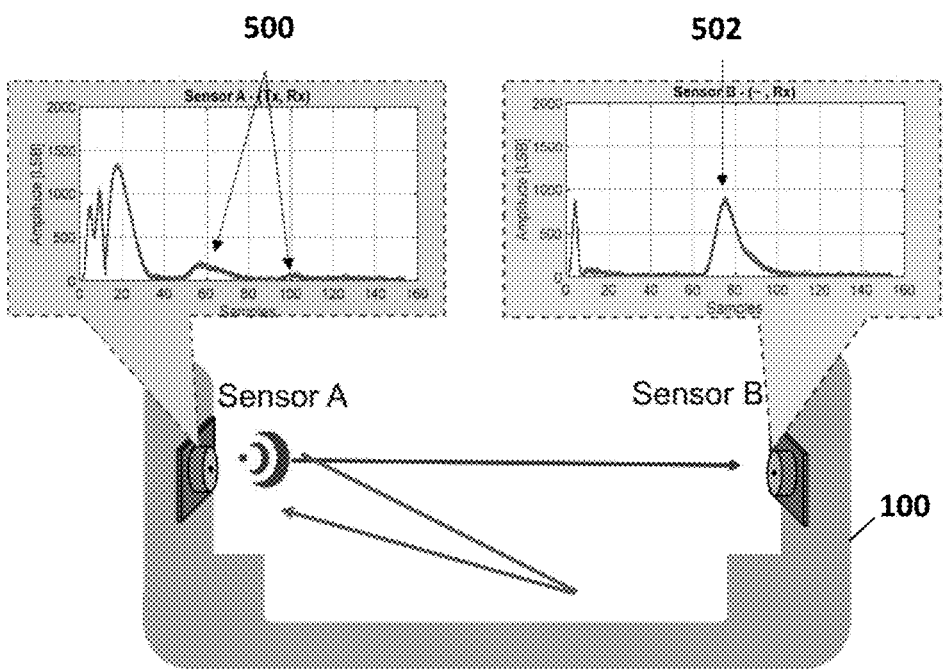
FIGS. 5 and 6 illustrate exemplary signals corresponding to the wearable device in a not worn state, in accordance with various embodiments.
Figure 6:
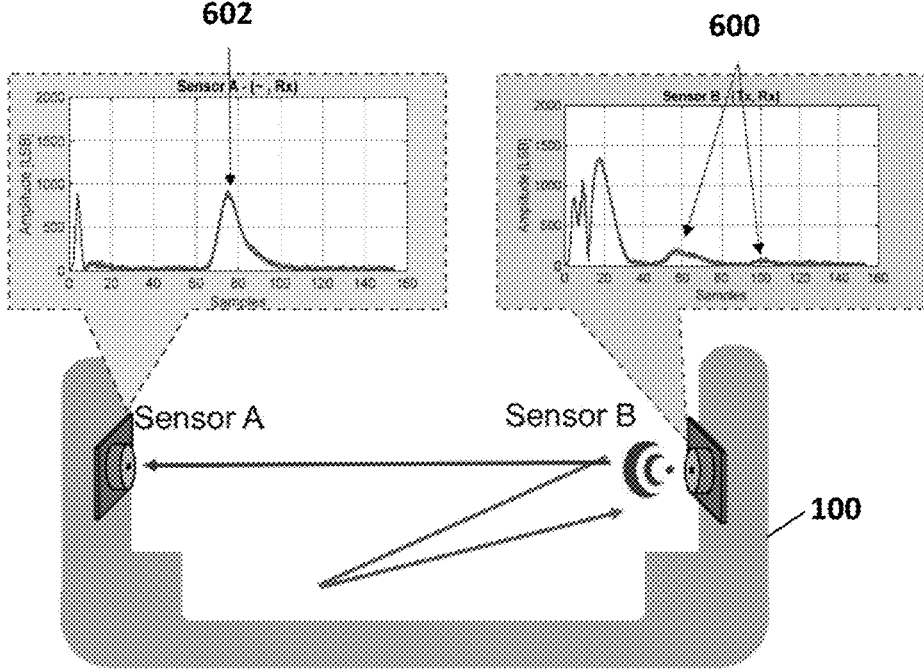

Referring now to FIGS. 5 and 6, the relationship between two transducers and the corresponding received signals are shown respectively when the wearable device is in the first state with respect to the user. First, FIG. 5 schematically illustrates Sensor A emitting a pulse, with the left graph showing the signal reflections from nearby objects received by Sensor A and with the right graph showing the signal received by Sensor B that was directly transmitted by Sensor A. Likewise, FIG. 6 schematically illustrates Sensor B emitting a pulse, with the right graph showing the signal reflections from nearby objects received by Sensor B and with the left graph showing the signal received by Sensor A that was directly transmitted by Sensor B. Notably, echoes 500 in FIGS. 5 and 600 in FIG. 6 are caused by reflections from interior surfaces of device 100, while peak 502 in FIG. 5 represents the reception by Sensor B of the pulse emitted by Sensor A and peak 602 in FIG. 6 represents the reception by Sensor A of the pulse emitted by Sensor B. As discussed above, the signals shown in FIGS. 5 and 6 are indicative of wearable device 100 being in the first state, namely when it is not being worn and no portion of the user's body is blocking the line of sight relationship between Sensors A and B.

Figure 7:
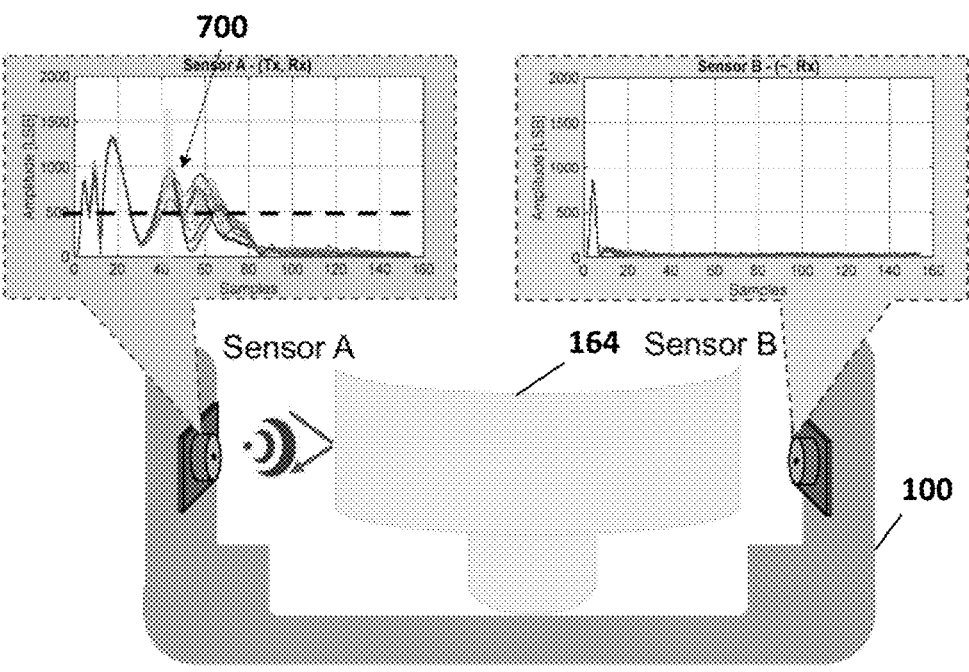
FIGS. 7 and 8 illustrate exemplary signals corresponding to the wearable device in a worn state, in accordance with various embodiments.
Figure 8:
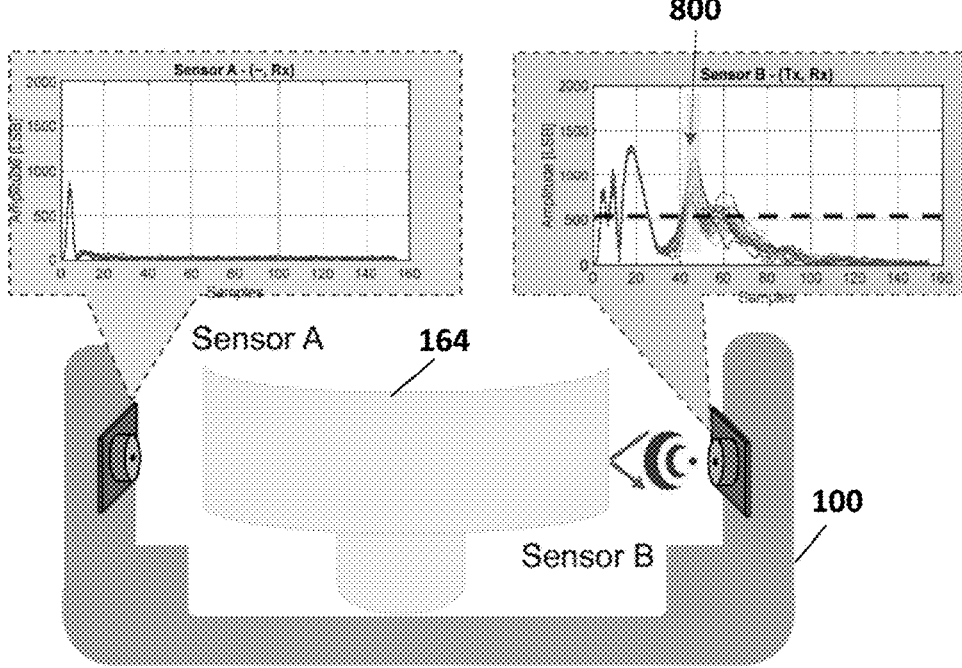

For comparison, FIGS. 7 and 8 show the relationship between two transducers and the corresponding received signals when the wearable device is in the second state with respect to the user. First, FIG. 7 schematically illustrates Sensor A emitting a pulse, with the left graph showing the signal reflections from nearby objects received by Sensor A and with the right graph showing no signal being received by Sensor B that was directly transmitted by Sensor A. Likewise, FIG. 8 schematically illustrates Sensor B emitting a pulse, with the right graph showing the signal reflections from nearby objects received by Sensor B and with the left graph showing no signal received by Sensor A that was directly transmitted by Sensor B. Further, the reflected signals shown in the left graph of FIG. 7 include echo 700, which indicates an object at the distance expected for head 164 when device 100 is being worn. Similarly, the reflected signals shown in the right graph of FIG. 8 include echo 800, which also indicates an object at the distance expected for head 164. As such, the signals shown in FIGS. 7 and 8 are indicative of wearable device 100 being in the second state, namely when it is being worn and head 164 blocks the line of sight relationship between Sensors A and B.

Figure 9:
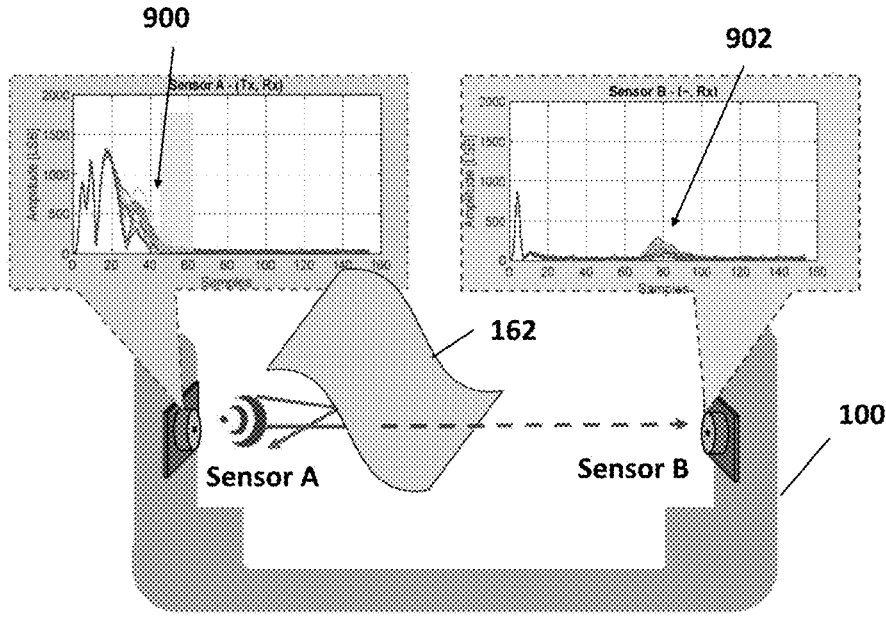
FIGS. 9 and 10 illustrate exemplary signals corresponding to the wearable device in a not worn state with partially obstructed transducers, in accordance with various embodiments.
Figure 10:
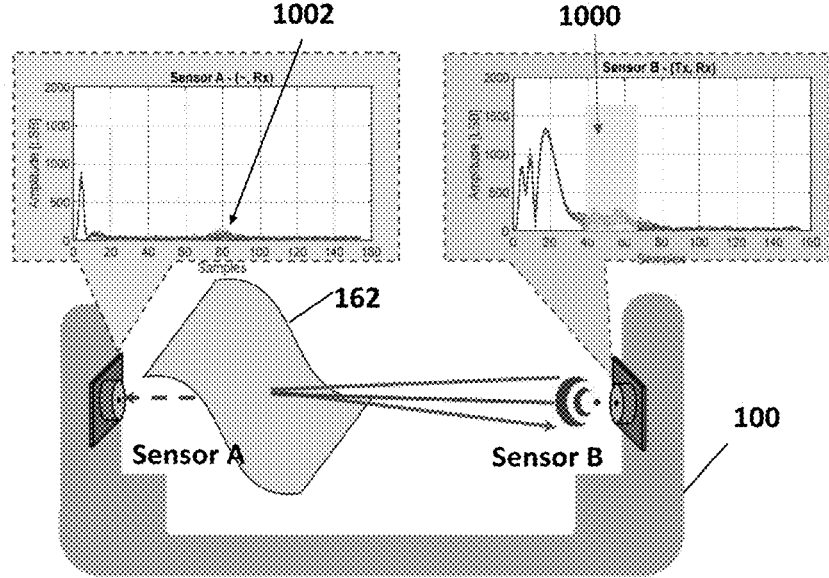

Next, FIGS. 9 and 10 show the relationship between two transducers and the corresponding received signals when the wearable device is in the first state with respect to the user, even though another object may be at least partially interfering with the line of sight relationship. Once more, FIG. 9 schematically illustrates Sensor A emitting a pulse, with the left graph showing the signal reflections from nearby objects received by Sensor A and with the right graph showing an attenuated signal being received by Sensor B that was directly transmitted by Sensor A. Likewise, FIG. 10 schematically illustrates Sensor B emitting a pulse, with the right graph showing the signal reflections from nearby objects received by Sensor B and with the right left graph showing an attenuated signal received by Sensor A that was directly transmitted by Sensor B. Notably, the reflected signals shown in the left graph of FIG. 9 include echoes 900, which exhibit different characteristics than echoes 1000 included in the reflected signals shown in the right graph of FIG. 10. The distances differ from what would be expected to be caused if head 164 were present. Instead, these reflected signals are caused at least in part by band 162. As discussed above, it is unlikely for another object to occupy the exact space that would be occupied by head 164, so the measured distances are different and not symmetrical, even though the sensors are placed symmetrically in this embodiment. Further, one of skill in the art will also recognize that the signals are more diffused and are distinguishable from a more solid object, such as would result from head 164 being detected. Additionally, peaks 902 and 1002 represent direct transmissions from the other transducer but are clearly recognizable as being attenuated as compared to the unobstructed transmissions shown in FIGS. 5 and 6.

From the above discussion, it will be understood that the existence of a direct line of sight between ultrasonic transducer pair 150 or the transducers of SPU 120 provides an unambiguous indication of device 100 being in the first state and not being worn by a user. However, an extraneous object such as band 162 or anything else completely or partially obstructing the line of sight between the transducers may complicate classification of the second state. Specifically, device 100 may still be in the first state even if direct transmission is blocked by an extraneous object. Thus, in addition to evaluating the returned signals to determine whether an object is positioned relative to the transducers where the user's head or other body portion would be expected, other techniques may be employed to make the classification more robust.

Figure 11:
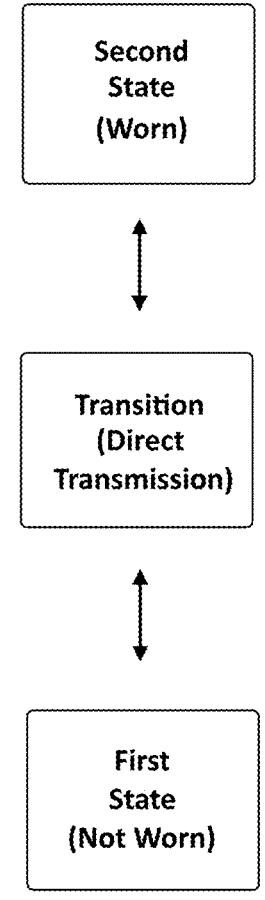
FIG. 11 illustrates a state diagram showing transition between the first state to the second state, in accordance with various embodiments.
Figure 12:
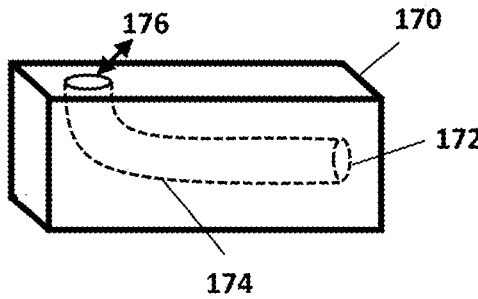
FIG. 12 schematically illustrates an ultrasonic transducer having a waveguide, in accordance with various embodiments.

As a further embodiment, FIG. 11 indicates the state transitions that occur as device changes between the first and second states. Particularly, the middle "Transition" state represents a condition that would occur even if another object subsequently obstructs the line of sight. For example, when device 100 is in the "Second State" and is being worn, direct transmission between the transducers cannot occur and the transducers will detect an object where the relevant portion of the user's body is expected. In order to change to the first state, the user must remove the device from the body. As it is being removed, the condition indicative of the middle "Transition" state will occur and one transducer can directly receive the pulse emitted by the other transducer. Specifically, band 162 will not have had an opportunity to fall into an obstructing position and similarly, no other objects will be able to occupy that space as device 100 is being removed from the body. Consequently, even if an extraneous object does come into an obstructing position, it will be distinguishable based on prior detection of the "Transition" state. A similar analysis may be performed for changes in the opposite direction, namely from the first state to the second state. Once more, if the transducers are partially obstructed, the directly received transmission will be attenuated as shown in FIGS. 9 and 10 and the detection of the "Transition" state prior to the complete blockage corresponding to the second state helps confirm the classification. Likewise, the lack of detection of an object at expected distances from the transducers is also indicative of the first state and detection of direct transmission of the "Transition" state helps confirm classification of the second state when an object at the expected distances is subsequently detected.

In some embodiments, another technique to augment the classification of first and second states includes the use of a transmission pathway configured to reduce or eliminate the effect of the ringdown blind spot. The physics of the operation of a transducer means that it is vibrating while emitting a pulse (in the emitting portion of its duty cycle) and perhaps shortly afterward due to the emission of the pulse. This vibration due to the emission of a pulse from a transducer has a very high amplitude and is referred to as "ringdown." While ringdown is present, detection of returned signals (in the receiving portion of its duty cycle) is difficult or, more likely, impossible due to the amplitude of the emitted pulse and its associated vibrations of a membrane of the transducer drowning out the weaker amplitude of returned signals. The time period associated with ringdown for a sonic transducer is assimilated to and corresponds to an area between the sonic transducer and the closest distance at which an object can be sensed by the sonic transducer using returned signals that correspond to signals emitted by the transducer. Correspondingly, depending on how the ultrasonic transducer pair is implemented in the wearable device, it may be difficult reliably detect a desired portion of the user's body, such as the head. As shown in FIG. 11, ultrasonic transducer 170 may be configured so that emitter 172 communicates through a waveguide 174 and the pulse then exits aperture 176. Appropriate design of waveguide 174 helps ensure that any ringdown blind spot occurs within this pathway so that an object immediately adjacent aperture 176 may still be detected reliably.

Still other techniques for augmenting the classification of the state of the wearable device can be employed. For example, the ringdown value of each transducer can be affected by whether an object is located in close proximity or not. As such, presence of the user's body may cause the transducer to have different ringdown characteristics than an extraneous object, such as band 162. In another embodiment, amplitude variation of the signals received by the transducers and/or motion sensor data may be employed to determine whether device 100 remains stationary for an amount of time that indicates it is not being worn by a user (such as when being stored on a mannequin or other similar condition).

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. In some configurations, a substrate portion known as a MEMS cap provides mechanical support for the MEMS structure. The MEMS structural layer is attached to the MEMS cap. The MEMS cap is also referred to as handle substrate or handle wafer. In the described embodiments, an electronic device incorporating a sensor may employ a sensor tracking module also referred to as Sensor Processing Unit (SPU) that includes at least one sensor in addition to electronic circuits. The sensor, such as a gyroscope, a magnetometer, an accelerometer, a microphone, a pressure sensor, a proximity sensor, or an ambient light sensor, among others known in the art, are contemplated. Some embodiments include accelerometer and gyroscope, which each provide a measurement along three axes that are orthogonal to each other. Such a device is often referred to as a 6-axis device. Other embodiments include accelerometer, gyroscope, and magnetometer, which each provide a measurement along three axes that are orthogonal to each other. Such a device is often referred to as a 9-axis device. Other embodiments may not include all the sensors or may provide measurements along one or more axes. The sensors may be formed on a first substrate. Other embodiments may include solid-state sensors or any other type of sensors. The electronic circuits in the SPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package.

In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise ratio relative to a discrete solution. Such integration at the wafer-level also enables the incorporation of a rich feature set which minimizes the need for external amplification.

In the described embodiments, raw data refers to measurement outputs from the sensors which are not yet processed. Motion data may refer to processed and/or raw data. Processing may include applying a sensor fusion algorithm or applying any other algorithm. In the case of a sensor fusion algorithm, data from a plurality of sensors may be combined to provide, for example, an orientation of the device. In the described embodiments, a SPU may include processors, memory, control logic and sensors among structures.

As discussed above, this disclosure is directed to a wearable device configured to be fitted to a user. The wearable device has a pair of ultrasonic transducers, each transducer configured to emit ultrasonic pulses and receive returned signals corresponding to the emitted ultrasonic pulses. The pair of ultrasonic transducers have predetermined positions with respect to the wearable device, are in a line of sight relationship when the user is in a first state with respect to the wearable device, and are not in a line of sight relationship when the user is in a second state with respect to the wearable device. The pair of ultrasonic transducers are configured to alternately emit ultrasonic pulses. The device also has at least one processor coupled with the pair of ultrasonic transducers and configured to evaluate the returned signals; and based at least in part on the evaluation, classify the state of the wearable device as being one of the first state and the second state.

In one aspect, wherein classifying the state of the wearable device may include a determination of whether the wearable device is being worn by the user.

In one aspect, the at least one processor may be is further configured to adjust behavior of the wearable device based at least in part on the classification.

In one aspect, the at least one processor may evaluate the returned signals at least in part by distinguishing reflected echoes corresponding to an ultrasonic pulse emitted by one ultrasonic transducer of the pair of ultrasonic transducers at a given epoch received by the one ultrasonic transducer and opposing transmissions received by one ultrasonic transducer of the pair of ultrasonic transducers that were emitted by another ultrasonic transducer of the pair of ultrasonic transducers at a previous epoch. The at least one processor may also evaluate the returned signals at least in part by determining whether the opposing transmissions were received directly or after reflection and/or by determining whether a directly received opposing transmission has been attenuated.

In one aspect, the at least one processor may also evaluate the returned signals at least in part by determining whether the opposing transmissions were received directly or after reflection and by determining whether a distance corresponding to a received reflected echo is consistent with an expected position of the user for at least one of the first state and the second state.

In one aspect, evaluating the returned signals may also include identifying at least one characteristic of the retuned signals that indicates a transition state between the first state and the second state.

In one aspect, at least one of the pair of ultrasonic transducers may have an extended waveguide configured to prevent an object from being positioned at a distance closer than a ringdown blind spot.

In one aspect, the device may be a headset.

This disclosure is also directed to a sensor processing unit that may be coupled to a pair of ultrasonic transducers, each transducer configured to emit ultrasonic pulses and receive returned signals corresponding to the emitted ultrasonic pulses. The pair of ultrasonic transducers have predetermined positions with respect to a wearable device configured to be fitted to a user, the pair of ultrasonic transducers are in a line of sight relationship when the user is in a first state with respect to the wearable device, and the pair of ultrasonic transducers are not in a line of sight relationship when the user is in a second state with respect to the wearable device. The pair of ultrasonic transducers may be configured to alternately emit ultrasonic pulses. At least one sensor processor may be coupled with the pair of ultrasonic transducers and configured to evaluate the returned signals and based at least in part on the evaluation, classify the state of the wearable device as being one of the first state and the second state.

In one aspect, at least one of the pair of ultrasonic transducers may have an extended audio waveguide configured to prevent an object from being positioned at a distance closer than a ringdown blind spot.

This disclosure also includes a method for classifying state of a wearable device, wherein the wearable device is configured to be fitted to a user. The method may involve alternately emitting ultrasonic pulses from a pair of ultrasonic transducers, such that each transducer may be configured to emit ultrasonic pulses and receive returned signals corresponding to the emitted ultrasonic pulses, the pair of ultrasonic transducers have predetermined positions with respect to the wearable device, the pair of ultrasonic transducers are in a line of sight relationship when the user is in a first state with respect to the wearable device, and the pair of ultrasonic transducers are not in a line of sight relationship when the user is in a second state with respect to the wearable device. The method may also involve evaluating retuned signals from received by the pair of ultrasonic transducers and classifying the state of the wearable device as being one of the first state and the second state based at least in part on the evaluation.

In one aspect, classifying the state of the wearable device may include a determination of whether the wearable device is being worn by the user.

In one aspect, the method may also involve adjusting behavior of the wearable device based at least in part on the classification.

In one aspect, evaluating the returned signals may be based at least in part by distinguishing reflected echoes corresponding to an ultrasonic pulse emitted by one ultrasonic transducer of the pair of ultrasonic transducers at a given epoch received by the one ultrasonic transducer and opposing transmissions received by one ultrasonic transducer of the pair of ultrasonic transducers that were emitted by another ultrasonic transducer of the pair of ultrasonic transducers at a previous epoch. Evaluating the returned signals may be based at least in part on determining whether the opposing transmissions were received directly or after reflection. Evaluating the returned signals may also be based at least in part on determining whether a directly received opposing transmission has been attenuated.

In one aspect, evaluating the returned signals may be based at least in part on determining whether a distance corresponding to a received reflected echo is consistent with an expected position of the user for at least one of the first state and the second state.

In one aspect, evaluating the returned signals may be based at least in part on determining whether the opposing transmissions were received directly or after reflection and on determining whether a distance corresponding to a received reflected echo is consistent with an expected position of the user for at least one of the first state and the second state.

In one aspect, evaluating the returned signals may also include identifying at least one characteristic of the retuned signals that indicates a transition state between the first state and the second state.

Although the present invention has been described in accordance with the embodiments shown, one of ordinary skill in the art will readily recognize that there may be variations to the embodiments and those variations would be within the spirit and scope of the present invention. One skilled in the art may readily devise other systems consistent with the disclosed embodiments which are intended to be within the scope of this disclosure.

What is claimed is:

1. A wearable device configured to be fitted to a user, comprising:
   a pair of ultrasonic transducers, each transducer configured to emit ultrasonic pulses and receive returned signals corresponding to the emitted ultrasonic pulses;
   wherein the pair of ultrasonic transducers have predetermined positions with respect to the wearable device;
   wherein the pair of ultrasonic transducers are in a line of sight relationship when the user is in a first state with respect to the wearable device,
   wherein the pair of ultrasonic transducers are not in a line of sight relationship when the user is in a second state with respect to the wearable device, and
   wherein the pair of ultrasonic transducers are configured to alternately emit ultrasonic pulses; and at least one processor coupled with the pair of ultrasonic transducers and configured to:

evaluate the returned signals; and based at least in part on the evaluation, classify the state of the wearable device as being one of the first state and the second state.

2. The wearable device of claim 1, wherein classifying the state of the wearable device comprises a determination of whether the wearable device is being worn by the user.

3. The wearable device of claim 1, wherein the at least one processor is further configured to adjust behavior of the wearable device based at least in part on the classification.

4. The wearable device of claim 1, wherein the at least one processor evaluates the returned signals at least in part by distinguishing reflected echoes corresponding to an ultrasonic pulse emitted by one ultrasonic transducer of the pair of ultrasonic transducers at a given epoch received by the one ultrasonic transducer and opposing transmissions received by one ultrasonic transducer of the pair of ultrasonic transducers that were emitted by another ultrasonic transducer of the pair of ultrasonic transducers at a previous epoch.

5. The wearable device of claim 4, wherein the at least one processor further evaluates the returned signals at least in part by determining whether the opposing transmissions were received directly or after reflection.

6. The wearable device of claim 5, wherein the at least one processor further evaluates the returned signals at least in part by determining whether a directly received opposing transmission has been attenuated.

7. The wearable device of claim 4, wherein the at least one processor further evaluates the returned signals at least in part by determining whether a distance corresponding to a received reflected echo is consistent with an expected position of the user for at least one of the first state and the second state.

8. The wearable device of claim 4, wherein the at least one processor further evaluates the returned signals at least in part by determining whether the opposing transmissions were received directly or after reflection and by determining whether a distance corresponding to a received reflected echo is consistent with an expected position of the user for at least one of the first state and the second state.

9. The wearable device of claim 4, wherein evaluating the returned signals further includes identifying at least one characteristic of the retuned signals that indicates a transition state between the first state and the second state.

10. The wearable device of claim 7, wherein at least one of the pair of ultrasonic transducers has an extended waveguide configured to prevent an object from being positioned at a distance closer than a ringdown blind spot.

11. The wearable device of claim 1, wherein the device comprises a headset.

12. At least one sensor processing unit comprising:

a pair of ultrasonic transducers, each transducer configured to emit ultrasonic pulses and receive returned signals corresponding to the emitted ultrasonic pulses;

wherein the pair of ultrasonic transducers have predetermined positions with respect to a wearable device configured to be fitted to a user;

wherein the pair of ultrasonic transducers are in a line of sight relationship when the user is in a first state with respect to the wearable device, wherein the pair of ultrasonic transducers are not in a line of sight relationship when the user is in a second state with respect to the wearable device, and wherein the pair of ultrasonic transducers are configured to alternately emit ultrasonic pulses; and at least one sensor processor coupled with the pair of ultrasonic transducers and configured to:

evaluate the returned signals; and based at least in part on the evaluation, classify the state of the wearable device as being one of the first state and the second state.

13. The sensor processing unit of claim 12, wherein at least one of the pair of ultrasonic transducers has an extended audio waveguide configured to prevent an object from being positioned at a distance closer than a ringdown blind spot.

14. A method for classifying state of a wearable device, wherein the wearable device is configured to be fitted to a user, comprising:

alternately emitting ultrasonic pulses from a pair of ultrasonic transducers, each transducer configured to emit ultrasonic pulses and receive returned signals corresponding to the emitted ultrasonic pulses;

wherein the pair of ultrasonic transducers have predetermined positions with respect to the wearable device;

wherein the pair of ultrasonic transducers are in a line of sight relationship when the user is in a first state with respect to the wearable device, wherein the pair of ultrasonic transducers are not in a line of sight relationship when the user is in a second state with respect to the wearable device;

evaluating retuned signals received by the pair of ultrasonic transducers; and classifying the state of the wearable device as being one of the first state and the second state based at least in part on the evaluation.

15. The method of claim 14, wherein classifying the state of the wearable device comprises a determination of whether the wearable device is being worn by the user.

16. The method of claim 14, further comprising adjusting behavior of the wearable device based at least in part on the classification.

17. The method of claim 14 wherein evaluating the returned signals is based at least in part by distinguishing reflected echoes corresponding to an ultrasonic pulse emitted by one ultrasonic transducer of the pair of ultrasonic transducers at a given epoch received by the one ultrasonic transducer and opposing transmissions received by one ultrasonic transducer of the pair of ultrasonic transducers that were emitted by another ultrasonic transducer of the pair of ultrasonic transducers at a previous epoch.

18. The method of claim 17, wherein evaluating the returned signals is based at least in part on determining whether the opposing transmissions were received directly or after reflection.

19. The method of claim 17, wherein evaluating the returned signals is based at least in part on determining whether a directly received opposing transmission has been attenuated.

20. The method of claim 17, wherein evaluating the returned signals is based at least in part on determining whether a distance corresponding to a received reflected echo is consistent with an expected position of the user for at least one of the first state and the second state.

21. The method of claim 17, wherein evaluating the returned signals is based at least in part on determining whether the opposing transmissions were received directly or after reflection and on determining whether a distance corresponding to a received reflected echo is consistent with an expected position of the user for at least one of the first state and the second state.

22. The method of claim 17, wherein evaluating the returned signals further includes identifying at least one characteristic of the retuned signals that indicates a transition state between the first state and the second state.

* * * * *